(12) United States Patent
Kang et al.

(10) Patent No.: US 10,826,850 B2
(45) Date of Patent: *Nov. 3, 2020

(54) SWITCH AND DATA ACCESSING METHOD THEREOF

(71) Applicant: VIA Alliance Semiconductor Co., Ltd., Shanghai (CN)

(72) Inventors: Xiaoliang Kang, Beijing (CN); Jiin Lai, New Taipei (TW); Weilin Wang, Beijing (CN); Peng Shen, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 84 days.

This patent is subject to a terminal disclaimer.

(21) Appl. No.: 16/297,551

(22) Filed: Mar. 8, 2019

(65) Prior Publication Data

US 2019/0207874 A1 Jul. 4, 2019

Related U.S. Application Data

(63) Continuation of application No. 15/299,486, filed on Oct. 21, 2016, now Pat. No. 10,270,714.

(30) Foreign Application Priority Data

May 13, 2016 (CN) .......................... 2016 1 0318355

(51) Int. Cl.
*H04L 12/861* (2013.01)
*H04L 29/08* (2006.01)
*H04L 12/935* (2013.01)
*H04L 29/06* (2006.01)

(52) U.S. Cl.
CPC .......... *H04L 49/9042* (2013.01); *H04L 49/30* (2013.01); *H04L 67/2842* (2013.01); *H04L 69/14* (2013.01)

(58) Field of Classification Search
CPC . H04L 49/30; H04L 49/9042; H04L 67/2842; H04L 69/14
See application file for complete search history.

(56) References Cited

U.S. PATENT DOCUMENTS 10,270,714 B2 * 4/2019 Kang .................. H04L 67/2842

FOREIGN PATENT DOCUMENTS

| CN | 103135957 A | 6/2013 |
|---|---|---|
| CN | 104125169 A | 10/2014 |

* cited by examiner

*Primary Examiner* — Asad M Nawaz
*Assistant Examiner* — Zhaohui Yang
(74) *Attorney, Agent, or Firm* — Chieh-Mei Wang

(57) ABSTRACT

A data accessing method of a switch for transmitting data packets between a first source node and a first target node and between a second source node and a second target node includes: transmitting a data packet to the switch via at least one of the first communication link and the third communication link and configuring the control unit to store information contained in the data packet into the storage unit; and retrieving the information contained in the data packet from the storage unit via at least one of the second communication link and the fourth communication link. The first source node, the second source node, the first target node and the second target node share the same storage blocks.

9 Claims, 6 Drawing Sheets

SWITCH AND DATA ACCESSING METHOD THEREOF

FIELD OF THE INVENTION

The present invention relates to a switch, and more particularly to a switch and a data accessing method thereof capable of managing storing resource centrally.

BACKGROUND OF THE INVENTION

FIG. 1 is a block diagram of a conventional switch. As shown, the conventional switch 100 includes a plurality of transmission ports 11, via which the switch 100 can perform data transmission with a plurality of calculator nodes 10. Each one of the transmission ports 11 corresponds to a storage unit with specific storage space. Specifically, each one of the transmission ports 11 includes a data receiving storage unit 12 and a data transmitting storage unit 13. The data receiving storage unit 12 and the data transmitting storage unit 13 are configured to store the data packets received by and transmitted to the switch 100, respectively. Generally, each transmission port of a conventional switch has its dedicated storage space; therefore, each one of the storage spaces is designed as large as possible to satisfy various storage statuses of the transmission ports, such as the factors of data packet transmission speed, bandwidth and reading delay, which may affect the use of the storage space. However, not every data packet transmission may use all of the storage space and not all of the transmission ports may transmit data packets simultaneously. Namely, when a conventional switch is in operation, it is possible that only a portion of the transmission ports are being used and another portion of the transmission ports are idled. Therefore, the conventional switch may have resource waste problem due to the idled storage space.

SUMMARY OF THE INVENTION

One objective of the present invention is to provide a switch that solves the problems mentioned in BACKGROUND OF THE INVENTION.

Another objective of the present invention is to provide a data accessing method adapted to be used with the aforementioned switch.

The present invention provides a switch configured to transmit data packets between a first source node and a first target node and between a second source node and a second target node. The switch includes a storage unit, a control unit, a first port, a second port, a third port and a fourth port. The storage unit includes a plurality of storage blocks and configured to cache the data packets. The control unit is configured to manage the storage blocks. A first communication link is established between the first source node and the control unit via the first port. A second communication link is established between the first target node and the control unit via the second port. A third communication link is established between the second source node and the control unit via the third port. A fourth communication link is established between the second target node and the control unit via the fourth port. The first source node and the second source node use the storage blocks of the storage unit via the first communication link and the third communication link respectively to cache the data packets transmitted from the first source node and the second source node. The first target node and the second target node receive the data packets transmitted from the first source node and the second source node respectively via the second communication link and the fourth communication link.

The present invention further provides a data accessing method of a switch for transmitting data packets between a first source node and a first target node and between a second source node and a second target node. The data accessing method includes: transmitting a data packet to the switch via at least one of the first communication link and the third communication link and configuring the control unit to store information contained in the data packet into the storage unit; and retrieving the information contained in the data packet from the storage unit via at least one of the second communication link and the fourth communication link, wherein the first source node, the second source node, the first target node and the second target node share the same storage blocks. The switch comprises the storage unit, the control unit, a first port, a second port, a third port and a fourth port. The first communication link is established between the first source node and the control unit via the first port. The second communication link is established between the first target node and the control unit via the second port. The third communication link is established between the second source node and the control unit via the third port. The fourth communication link being established between the second target node and the control unit via the fourth port.

In summary, by configuring a plurality of source nodes and target nodes to share the same storage unit, multiple source nodes could cache data packets into the storage unit via the respective communication link, and multiple target nodes could retrieve the data packets from the storage unit via the respective communication link. The switch of the present invention has improved storage resource allocation and can save more cache space, as compared with the conventional switch. Further, by configuring the control unit to manage the storage unit, the data accessing of the present invention has higher efficiency.

BRIEF DESCRIPTION OF THE DRAWINGS

Other advantages, objectives and features of the present invention will become apparent from the following description referring to the attached drawings.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
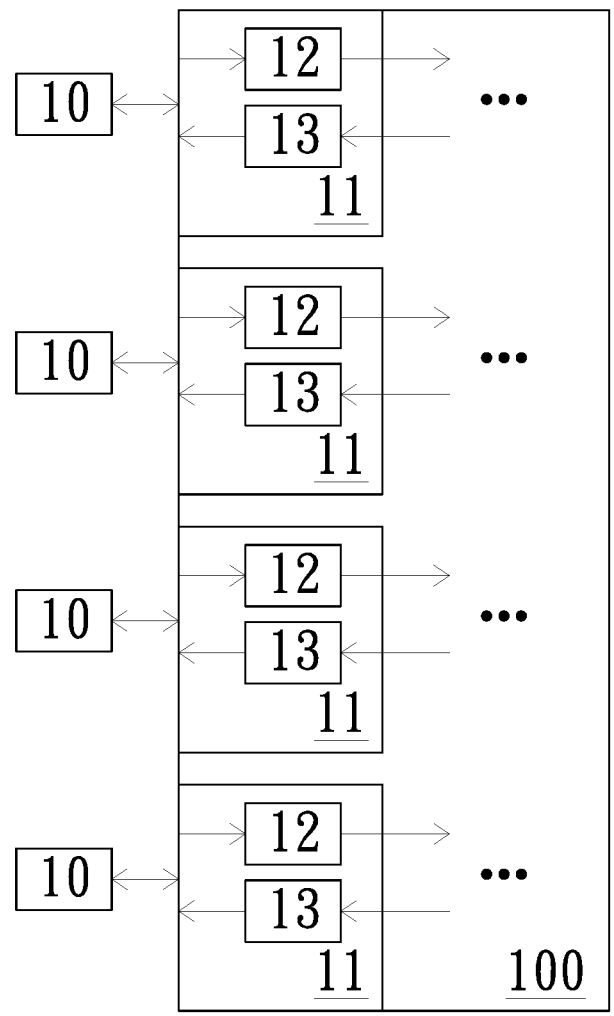
FIG. 1 is a block diagram of a conventional switch.
Figure 2:
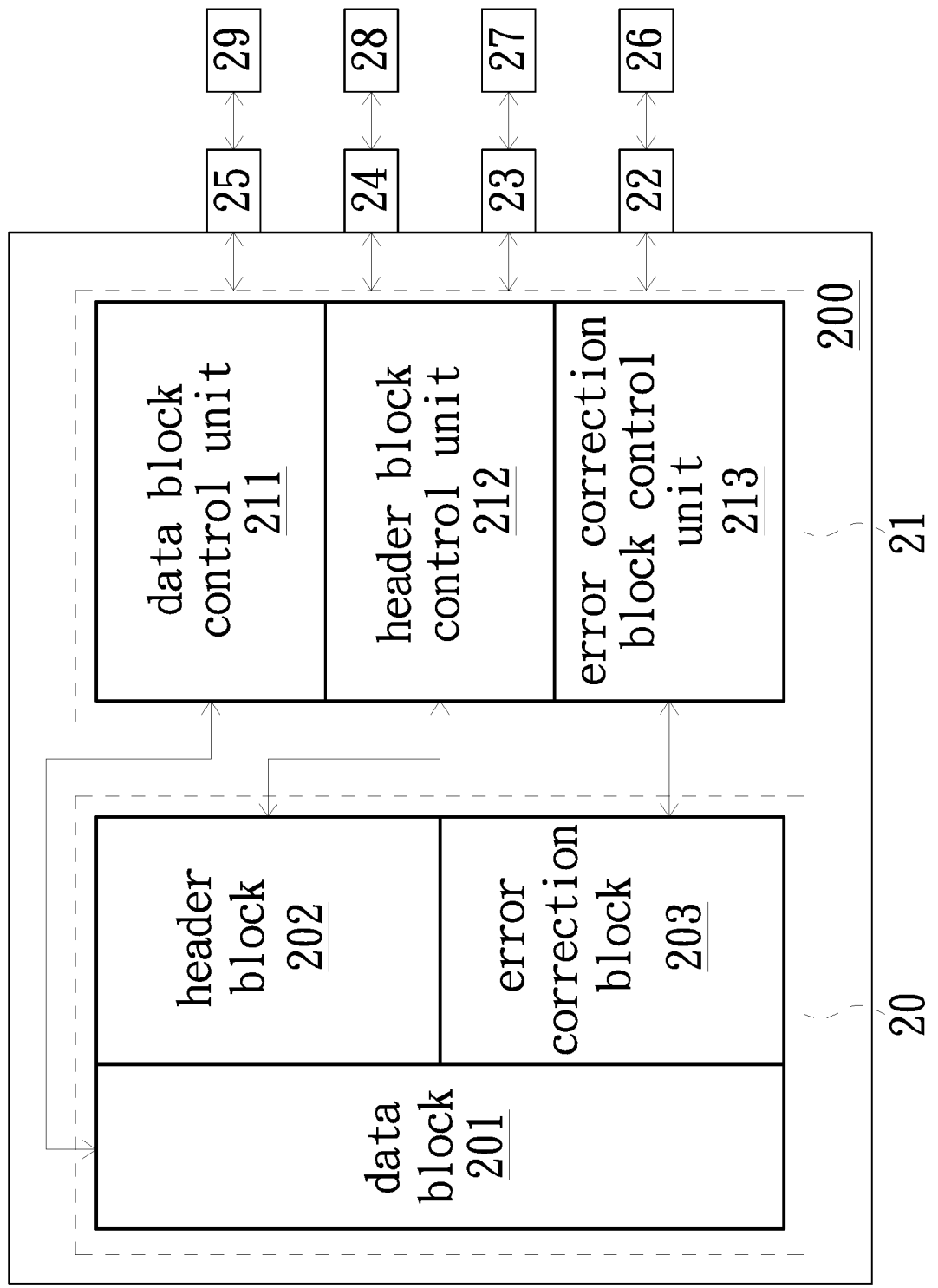
FIG. 2 is a block diagram of a switch in accordance with an embodiment of the present invention

FIG. 2 is a block diagram of a switch in accordance with an embodiment of the present invention. As shown in FIG. 2, the switch 200 of the present embodiment is adapted to transmit data packets between a first source node 26 and a first target node 27 and between a second source node 28 and a second target node 29. The switch 200 includes a storage unit 20, a control unit 21, a first port 22, a second port 23, a third port 24 and a fourth port 25. The storage unit 20 includes a plurality of storage blocks and configured to cache the data packets. The control unit 21 is configured to manage the storage blocks. A first communication link is established between the first source node 26 and the control unit 21 via the first port 22. A second communication link is established between the first target node 27 and the control unit 21 via the second port 23. A third communication link is established between the second source node 28 and the control unit 21 via the third port 24. A fourth communication link is established between the second target node 29 and the control unit 21 via the fourth port 25. The first source node 26 and the second source node 28 use the data blocks of the storage unit 20 via the first communication link and the third communication link respectively to cache the data packets transmitted from the first source node 26 and the second source node 28. The first target node 27 and the second target node 29 receive the data packets transmitted from the first source node 26 and the second source node 28 respectively via the second communication link and the fourth communication link via the storage unit 20. In the embodiment of the present invention, each one of the data packets includes header information, data information and error correction information, which are sequentially cached in the different data blocks of the storage unit 20, but the present invention is not limited thereto. By taking the first port 22, second port 23, third port 24 and fourth port 25 being peripheral component interconnect express (PCIE) standard ports as an example, the data packet can be a transaction layer packet (TLP) and the header information includes information regarding which target port the data packet is transmitted to and other related header information. In one embodiment in which a plurality of switches 200 are coupled in series, all of the ports are uniformly numbered and accordingly the transit port can knowledge which target port the data packet is eventually transmitted to according to the header information.

The storage unit 20 includes a data block 201, a header block 202 and an error correction block 203. The control unit 21 includes a data block control unit 211, a header block control unit 212 and an error correction block control unit 213. The data block control unit 211 is configured to store the data information contained in the data packet transmitted from at least one of the first source node 26 and the second source node 28 into the data block 201. The header block control unit 212 is configured to store the header information contained in the data packet into the header block 202. The error correction block control unit 213 is configured to store the error correction information contained in the data packet into the error correction block 203. In the embodiment of the present invention, the control unit 21 may be implemented by a logic circuit composed of a plurality of logic gates; that is, the control unit 21 of the present invention can be realized via various logic circuit structures, and no redundant detail is to be given herein.

Figure 3:
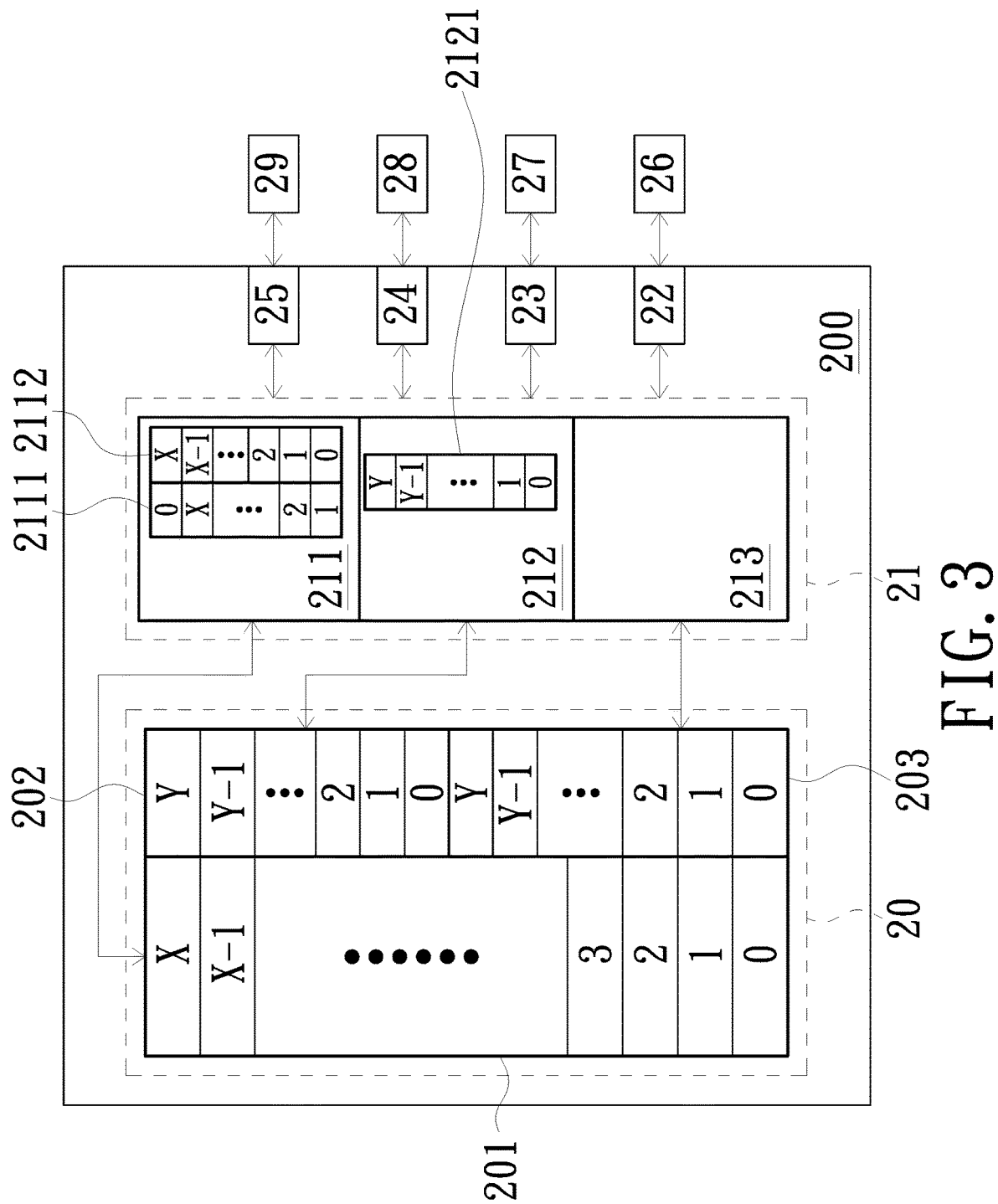
FIG. 3 is a detailed block diagram of a switch in accordance with an embodiment of the present invention.

FIG. 3 is a detailed block diagram of a switch in accordance with an embodiment of the present invention. Components in FIG. 3 that are identical to those shown in FIG. 2 are labeled with the same numberings. As shown in FIG. 3, the header block 202 includes a plurality of entries 0, 1, 2, . . . , Y−1 and Y. The header block control unit 212 includes a header available entry marking unit 2121. The header available entry marking unit 2121 is configured to mark available entries in the header block 202. The header block control unit 212 is configured to store the header information into the corresponding available entries according to the available entries marked by the header available entry marking unit 2121. For example, if the header available entry marking unit 2121 marks the entry 0 as in an available state (that is, no stored data yet), then the header block control unit 212 caches the header information contained in the data packet transmitted from the source node (the first source node 26 or the second source node 28) into the entry 0 in the header block 202. In the present embodiment, the cache space of each one of the entries in the header block 202 is designed to store one record of header information with a length up to 192 bits, for example. That is, each record of header information occupies the cache space of one entry at most.

Please continue to refer to FIG. 3. The error correction block 203 includes a plurality of entries 0, 1, 2, . . . , Y−1 and Y. The error correction block control unit 213 is configured to store the error correction information into the corresponding available entries according to the available entries marked by the header available entry marking unit 2121 of the header block control unit 212. Namely, the header information and the error correction information are synchronously stored into the corresponding available entries in the present invention. For example, if the header available entry marking unit 2121 marks the entry 0 as in an available state (that is, no stored data yet), then not only the header block control unit 212 caches the header information contained in the data packet transmitted from the source node (the first source node 26 or the second source node 28) into the entry 0 of the header block 202 but also the error correction block control unit 213 caches the error correction information contained in the data packet transmitted from the source node into the entry 0 of the error correction block 203, due to that the number/quantity of the entries 0-Y in the header block 202 is equal to the number/quantity of the entries 0-Y in the error correction block 203. In the present embodiment, the cache space of each one of the entries in the error correction block 203 is designed to store one record of error correction information with up to 32 bits, for example. That is, each record of error correction information occupies the cache space of one entry at most. Therefore, by utilizing the available entries marked by the header available entry marking unit 2121 of the header block control unit 212, the header block control unit 212 and the error correction block control unit 213 can synchronously cache the header information and the error correction information contained in the data packet into the corresponding entries of the header block 202 and the error correction block 203 respectively, thereby reducing the calculation load of the switch system, but the present invention is not limited thereto.

Please continue to refer to FIG. 3. The data block 201 includes a plurality of entries 0, 1, 2, . . . , X−1 and X. The data block control unit 211 includes a data entry link unit 2111 and a data available entry marking unit 2112. The data available entry marking unit 2112 is configured to mark the available entries in the data block 201. The data block control unit 211 is configured to store the data information into the corresponding available entries in the data block 201 according to the available entries marked by the data available entry marking unit 2112. The data entry link unit 2111 is configured to point to a next used entry relative to a corresponding entry of the data block 201. For example, if the data information contained in the data packet from the first source node 26 needs three entries in the data block 201 for caching and the data available entry marking unit 2112 marks the entries 0-2 in the data block 201 as available, the data information contained in the data packet are divided into three records and the three records of data information are then sequentially cached into the entries 0-2. Correspondingly, when trying to retrieve the three records of data information, the first target node 27 sequentially retrieves the corresponding data information according to the entries pointed at by the data entry link unit 2111. Specifically, if the data available entry marking unit 2112 marks the entries 0-2 in the data block 201 as available, then the first record of data information is cached in the entry 0, the second record of data information is cached in the entry 1, and the data entry link unit 2111 points to the entry 1 to indicate that the second record of data information, cached after the first record of data information, is cached in the entry 1. Likewise, when the second record of data information is cached in the entry 1 and the third record of data information is cached in the entry 2, the data entry link unit 2111 points to the entry 2 to indicate that the third record of data information, cached after the second record of data information, is cached in the entry 2. It is to be noted that although the records of data information in the above embodiment are adjacently and sequentially cached in the continuous entries 0-2, but the present invention is not limited thereto. That is, the entry in which the data information is to be cached is determined according to the available entries marked by the data available entry marking unit 2112, instead of a continuous order. In the present invention, the data block control unit 211 caches the data information contained in the data packet in unit of entry. By taking the first port 22, second port 23, third port 24 and fourth port 25 being PCIE standard ports as an example, the length of one record of data information contained in the data packet is not fixed; and the length of data information contained in the TLP packet is up to 1024 double words (DW) according to the PCIE specification. By taking the cache space of each one of the entries in the data block 201 being designed to 32 double words (1024 bits) as an example, the data information contained in one TLP packet may occupy up to 32 entries. In one embodiment, the data block 201 is composed of eight 128-bit memories. In the present invention, the data block control unit 211 can cache up to one entry (i.e., 32 double words) of data information per clock cycle. Therefore, 32 clock cycles are required to complete one cache if the data information contained in one TLP packet is 1024 double words. Summarily, in the present invention, the data block control unit 211 store the data information contained in the data packet from the source node (the first source node 26 or the second source node 28) into the data block 201 according to the data available entry marking unit 2112 and retrieves the data information contained in the data packet from the data block 201 to the target node (the first target node 27 or the second target node 29) in the storing order according to the data entry link unit 2111.

Figure 4:
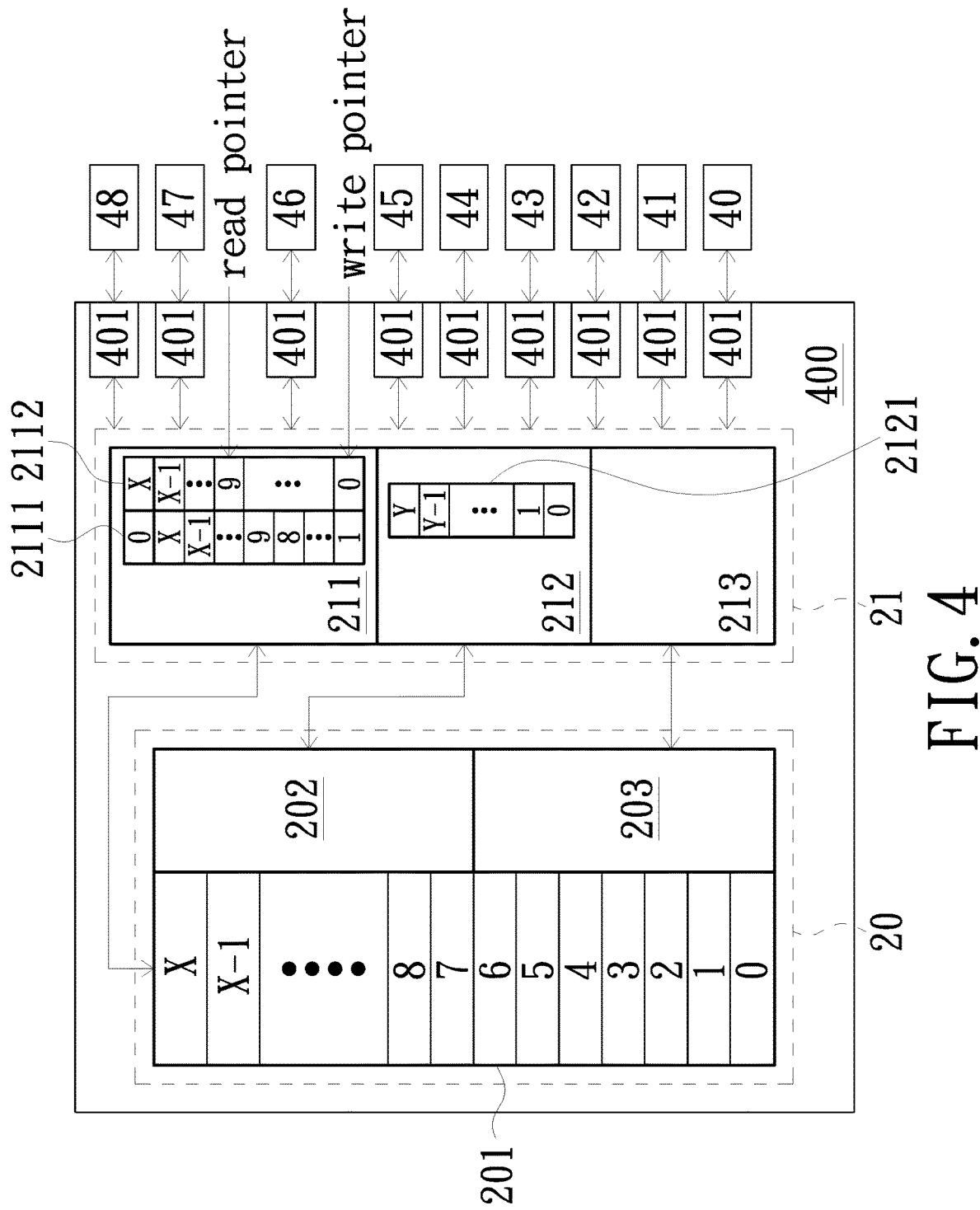
FIG. 4 is a block diagram illustrating a switch accessing data in accordance with an embodiment of the present invention.

FIG. 4 is a block diagram illustrating a switch accessing data in accordance with an embodiment of the present invention. Components and signals in FIG. 4 that are identical to those shown in FIG. 3 are labeled with the same numberings. As shown in FIG. 4, the switch 400 of the present embodiment includes a plurality of ports 401. A plurality of communication links are established between control unit 21 and the source nodes 40, 41, 42, 43, 44, 45, 46, 47 and 48 via the plurality of ports 401, respectively. As described above, in one embodiment, the header information contained in each one of the data packets from the source nodes 40-48 occupies only one entry in the header block 202; the error correction information contained in each one of the data packets from the source nodes 40-48 occupies only one entry in the error correction block 203; and no redundant detail is to be given herein. However, the length of the data information contained in each one of the data packets from the source nodes 40-48 is not fixed and the data information may occupy more than one entry in the data block 201, therefore, an indication of the data entry link unit 2111 is needed for linking the entries in which the plurality of records of data information contained in each one of the data packets to be cached. As a result, the accessing efficiency of the data information is improved and the calculation load of the switch 400 is reduced. In the present embodiment, in order to make the source nodes 40-48 capable of simultaneously writing the data information contained in the data packets into the data block 201, the data block 201 pre-reserves an entry for each one of the source nodes 40-48 during an initial period (a period during which the source node has not written data packet yet). For example, the entry 0 is pre-reserved for the source node 40, the entry 1 is pre-reserved for the source node 41, the entry 2 is pre-reserved for the source node 42, . . . , and the entry 8 is pre-reserved for the source node 48. Therefore, when desiring to simultaneously transmit data packets to the switch 400, the source nodes 40-48 write the respective data information into the pre-reserved entries 0-8, respectively. However, in practical terms, not all of the source nodes 40-48 simultaneously transmit data packets to the switch 400; therefore, if any source node not transmitting data packet, the respective pre-reserved entry is still reserved and not occupied by the data information transmitted by other source nodes.

As shown in FIG. 4, if all of the source nodes 40-48 write the data information into the pre-reserved entries 0-8 in the data block 201 respectively, the data available entry marking unit 2112 points the available entry to the entry 9 according to a read pointer. That is, when the source nodes 40-48 have a next record of data information to be written, according to the read pointer it is known that this record of data information would be written into the entry 9 of the data block 201. The detail will be described in the next paragraph in conjunction with FIG. 5. In addition, the data available entry marking unit 2112 further uses a write pointer to point at the available entries with released cache space. The detail will be described in the next paragraph in conjunction with FIG. 5. In the present embodiment, because all of the source nodes 40-48 writes the respective data information into the pre-reserved entries 0-8 in the data block 201 during the initial period respectively, the positions of the entries 0-8 of the data entry link unit 2111 sequentially point to the entries 1-9, thereby pointing the next used entry relative to the entry 0 is entry 1, the next used entry relative to the entry 1 is entry 2, . . . , and so on.

Figure 5:
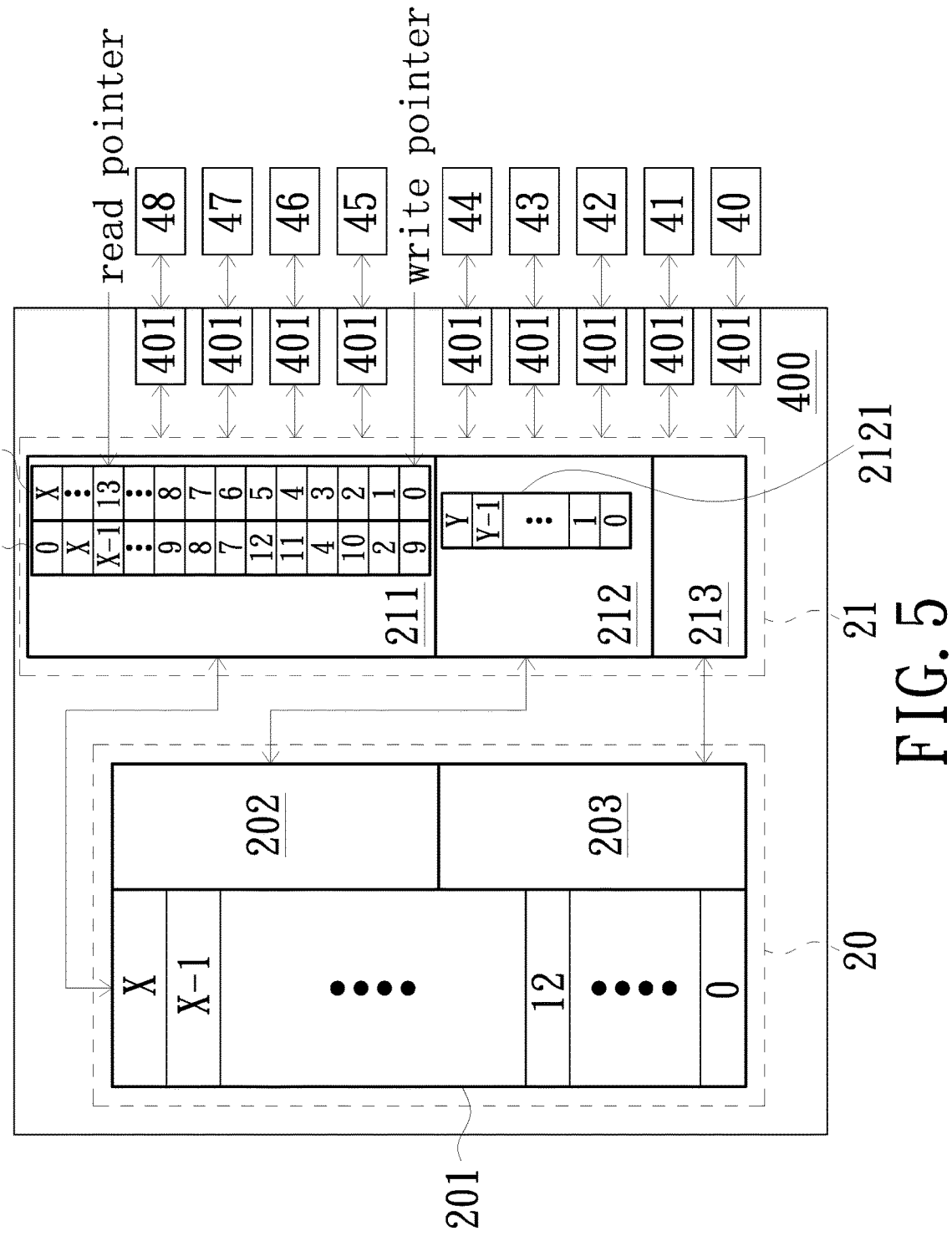
FIG. 5 is a block diagram illustrating a switch accessing data in accordance with another embodiment of the present invention.

FIG. 5 is a block diagram illustrating a switch accessing data in accordance with another embodiment of the present invention. Components and signals in FIG. 5 that are identical to those shown in FIG. 4 are labeled with the same numberings. Specifically, the block diagram of FIG. 5 depicts a writing period after the source nodes 40-48 of the switch 400 of FIG. 4 write the respective data information contained in the data packets into the entries 0-8 in the data block 201 during the initial period. It is to be noted that the data information contained in the data packets transmitted by the source nodes 40-48 may occupy a plurality of entries in the data block 201, and the detail will be described in FIG. 5.

Please continue to refer to FIG. 5. During the writing period, if each one of the data packets transmitted by the source nodes 40, 42, 44 and 45 among the source nodes 40-48 still has a second record of data information to be written, the second records of data information transmitted by the source nodes 40, 42, 44 and 45 are written into the entries 9-12 of the data block 201 according to the available entry 9 marked by the data available entry marking unit 2112 in FIG. 4 (via the read pointer). In one embodiment, it is to be noted that even the source nodes 40-48 do not write respective data information into the entries 0-8 during the initial period respectively, the entries 0-8 are still reserved for the source nodes 40-48 and not occupied by the data of other source nodes respectively; that is, the available entry marked by the data available entry marking unit 2112 is still the entry 9. At this time, because the entries 0-12 have stored respective data information, the read pointer of the data available entry marking unit 2112 would point to the entry 13 to make the data available entry marking unit 2112 mark the entry 13 as available according to the read pointer.

Please refer to FIG. 4 and FIG. 5. Specifically, the source node 40 writes the first record of data information contained in the respective data packet into the available entry 0 in the data block 201 and writes the second record of data information therein into the available entry 9 in the data block 201. Therefore, the data entry link unit 2111 marks the next used entry relative to the used entry 0 is the entry 9 at the position of the entry 0, thereby facilitating the target node (not shown) to read the data information cached in the entry 0 and then read the data information cached in the entry 9 according to the indication of the data entry link unit 2111 while reading the data packet. Similarly, the source node 42 writes the first record of data information contained in the respective data packet into the available entry 2 in the data block 201 and writes the second record of data information therein into the available entry 10 in the data block 201. Therefore, the data entry link unit 2111 marks the next used entry relative to the used entry 2 is the entry 10 at the position of the entry 2, thereby facilitating the target node (not shown) to read the data information cached in the entry 2 and then read the data information cached in the entry 10 according to the indication of the data entry link unit 2111 while reading the data packet. Similarly, the source node 44 writes the first record of data information contained in the respective data packet into the available entry 4 in the data block 201 and writes the second record of data information therein into the available entry 11 in the data block 201. Therefore, the data entry link unit 2111 marks the next used entry relative to the used entry 4 is the entry 11 at the position of the entry 4, thereby facilitating the target node (not shown) to read the data information cached in the entry 4 and then read the data information cached in the entry 11 according to the indication of the data entry link unit 2111 while reading the data packet. Similarly, the source node 45 writes the first record of data information contained in the respective data packet into the available entry 5 in the data block 201 and writes the second record of data information therein into the available entry 12 in the data block 201. Therefore, the data entry link unit 2111 marks the next used entry relative to the used entry 5 is the entry 12 at the position of the entry 5, thereby facilitating the target node (not shown) to read the data information cached in the entry 5 and then read the data information cached in the entry 12 according to the indication of the data entry link unit 2111 while reading the data packet.

In general, since multiple source nodes would write the respective data information contained in the respective data packets into the data block 201 simultaneously, the second record of data information (if the second record of data information exists) or the data information more than the second record (if the data information more than the second record exists) contained in the data packet transmitted by each one of the source nodes would not be written into the entry adjacent to the entry with the first record of data information. Therefore, instead of reading according to a sequential order, the data entry link unit 2111 points at the next used entry of a current entry in the plurality of entries of the data block 201 thereby facilitating the target node to read the corresponding data information more quickly and accurately.

For example, when reading the data information that the source nodes 40 and 45 cached in the data block 201, the target node sequentially reads the data information cached in the entries 0 and 9 to obtain the data packet transmitted from the source node 40 and sequentially reads the data information cached in the entries 5 and 12 to obtain the data packet transmitted from the source node 45. After the data information cached in the entries 0, 9, 5 and 12 of the data block 201 is read, the cache space corresponding to the entries 0, 9, 5 and 12 is released for another cache. It is to be noted that besides using the read pointer to point at the current available entry (e.g., entry 13) in the current data block 201 capable of caching data information, the data available entry marking unit 2112 of the present embodiment also uses the write pointer to point that the number/quantity of the entry with released cache space (e.g., entries 0, 9, 5 and 12) is four. For example, the write pointer is added from 0 to 4 when the cache space of the entries 0, 9, 5 and 12 is released (not shown in FIG. 5), which indicates that the empty entry is added into the data available entry marking unit 2112 from the position 4. Correspondingly, the positions 0-3 of the data available entry marking unit 2112 store the entry numberings of the released entries 0, 9, 5 and 12. In the embodiment of the present invention, the data blocks 201-203 in the storage unit 20 are implemented by static random access memory (SRAM), but the present invention is not limited thereto.

The present embodiment will be further described in conjunction with FIG. 2. Referring to FIG. 2. When the source node 26 and/or the source node 28 transmits the data packet to the switch 200 via the communication link, the header block control unit 212, the error correction block control unit 213 and the data block control unit 211 store the header information, the error correction information and the data information contained in the data packet into the corresponding entries respectively. The switch 200 correspondingly generates a storing address and returns the generated storing address to the corresponding source node 26 and/or the source node 28. Specifically, the storing address includes a data start address and a header address (see Table 1 below for detailed example). It should be clear that the port (e.g., the first port 22 and the third port 24) of each one of the source nodes is disposed with an address queue (not shown) for storing the storing addresses returned from the switch 200 related to the header information, the error correction information and the data information in the header block 202, the error correction block 203 and the data block 201, respectively. The source node 26 and/or 28 transmits the storing address registered in the address queue to the corresponding target node 27 and/or 29 via a bypass channel (not shown). When retrieving the data packet from the switch 200 via the corresponding communication link, the target node 27 and/or 29 retrieves the data information from the corresponding entries in the data block 201 according to the storing address and control information contained in a transmitting instruction (see Table 2 below for detailed example). Then, when successfully retrieving the data information from the corresponding entries in the data block 201, the target node 27 and/or 29 returns a clear message (see Table 3 below for the detailed exemplary specification) according to a result of the aforementioned data retrieval. The switch 200 clears the header information, the error correction information and the data information stored in the corresponding entries in the header block 202, the error correction block 203 and the data block 201 according to the clear message, respectively. The control information and the clear message includes the data start address, the header address, identification information of the source node, data packet format information, data packet length information, port operation information and port state information.

Table 1 shows an exemplary format of storing address. For example, the length of the storing address is 20 bits (e.g., bits 0-20). Specifically, bits 0-10 record the start address of the data information cached in the data block 201 of the storage unit 20 and bits 11-20 record the address of the header information cached in the header block 202 of the storage unit 20. The aforementioned bit number/quantity for the length of storing address is for an exemplary purpose only, and the present invention is not limited thereto. Further, in the present embodiment, the storing address does not contain the address of the error correction information of the data packet cached in the error correction block 203, due to that the lengths of the error correction information and the header information are fixed (specifically, only the total length of the data information has an limitation but the length of each record of data information has no limitation) so that the error correction information can share the available entries marked by the header available entry marking unit 2121 with the header information to simultaneously cache the error correction information in the available entries in the error correction block 203. Namely, the storing address of the error correction information at the error correction block 203 is equal to the storing address of the header information at the header block 202, but the present invention is not limited thereto.

TABLE 1

Format of Storing Address

| Bit | Representative Information |
|---|---|
| 11-20 | address of header information contained in data packet |
| 0-10 | start address of data information contained in data packet |

Table 2 shows an exemplary format of control information. For example, the length of the control information is 42 bits (e.g., bits 0-41). Specifically, bits 0-10 record the start address of the data information cached in the data block 201. Bits 11-20 record the address of the header information cached in the header block 202. Bits 21-26 record the numberings of each one of the source nodes so that these source nodes are distinguishable; specifically, in one embodiment in which a plurality of switches 200 are coupled in series, all of the ports have uniform numberings and accordingly the transit port can knowledge which target port the data packet is eventually transmitted to according to the header information. Bits 27-28 record the type of the data packet; for example, in the embodiment of the ports 22-25 adopting the PCIE standard, the type of the data packet includes Non-posted, CPL and Posted Write, but the present invention is not limited thereto. Bits 29-38 record the length of the data packet. Bits 39-40 record the state of the control information (belonging to access information or clear message); for example, the control information is in a clear message state if the binary information code of the bits 39-40 is 11 and the control information is in an access state if the binary information code of the bits 39-40 is 10. In one embodiment, binary information code 11 of the bits 39-40 is referred to as a confirm message which indicates that the read of the data packet is completed and the caching space of the corresponding entries in the storage unit 20 may be released. Bit 41 records the information for indicating whether the data packets includes the data information; for example, it is indicated that the data packet does not include the data information if the binary information code of the bit 41 is 0 and it is indicated that the data packet includes the data information if the binary information code of the bit 41 is 1. The aforementioned bit number/quantity for the length of control information is for an exemplary purpose only, and the present invention is not limited thereto.

TABLE 2

Format of Control Information

| Bit | Representative Information |
|---|---|
| 41 | data packet whether include data information<br>1: data packet include data information<br>0: data packet not include data information |
| 39-40 | state of control information<br>10: read state<br>11: clear state |
| 29-38 | length of data packet |
| 27-28 | format of data packet |
| 21-26 | numberings of all source nodes |
| 11-20 | address of header information contained in data packet |
| 0-10 | start address of data information contained in data packet |

Table 3 shows an exemplary format of the clear message. For example, the length of the clear message is 42 bits (e.g., bits 0-41). Specifically, bits 0-10 record the start address of the data information cached in the data block 201. Bits 11-20 record the address of the header information cached in the header block 202. Bits 21-26 record the numberings of each one of the source nodes thereby distinguishing these source nodes. Bits 27-28 record the type of the data packet. Bits 29-38 record the length of the data packet. Bits 39-40 record the state of the clear message; for example, the clear message is in a clear message state if the binary information code of the bits 39-40 is 11 and the clear message is in a reserved state if the binary information code of the bits 39-40 is 10. In one embodiment, if the binary information code of the bits 39-40 in the received clear message is 11, the switch 200 clears and releases the caching space of the corresponding entries in the storage unit 20 for the next cache. Alternatively, if the binary information code of the bits 39-40 in the received clear message not 11 (e.g., 10), the switch 200 reserves the information stored in the corresponding entries in the storage unit 20. Bit 41 records the information for indicating whether the data packets includes the data information; for example, it is indicated that the data packet does not include the data information if the binary information code of the bit 41 is 0 and it is indicated that the data packet includes the data information if the binary information code of the bit 41 is 1. The aforementioned bit number/quantity for the length of control information is for an exemplary purpose only, and the present invention is not limited thereto.

Further, in Tables 2 and 3 of the present embodiment, the table 2 and 3, the only difference between the control information and the clear message is the meaning represented by the bits 39-40. However, the binary information code of the bits 39-40 recorded in the clear message is also 11 when the binary information code of the bits 39-40 recorded in the control information is 11, thereby notifying the switch 200 to clear and release the cache space of the corresponding entries in the storage unit 20.

TABLE 3

| Bit | Representative Information |
| --- | --- |
| 41 | data packet whether include data information<br>1: data packet include data information<br>0: data packet not include data information |
| 39-40 | state of clear message<br>not 11: reserved state<br>11: clear state |
| 29-38 | length of data packet |
| 27-28 | format of data packet |
| 21-26 | numberings of all source nodes |
| 11-20 | address of header information contained in data packet |
| 0-10 | start address of data information contained in data packet |

Figure 6:
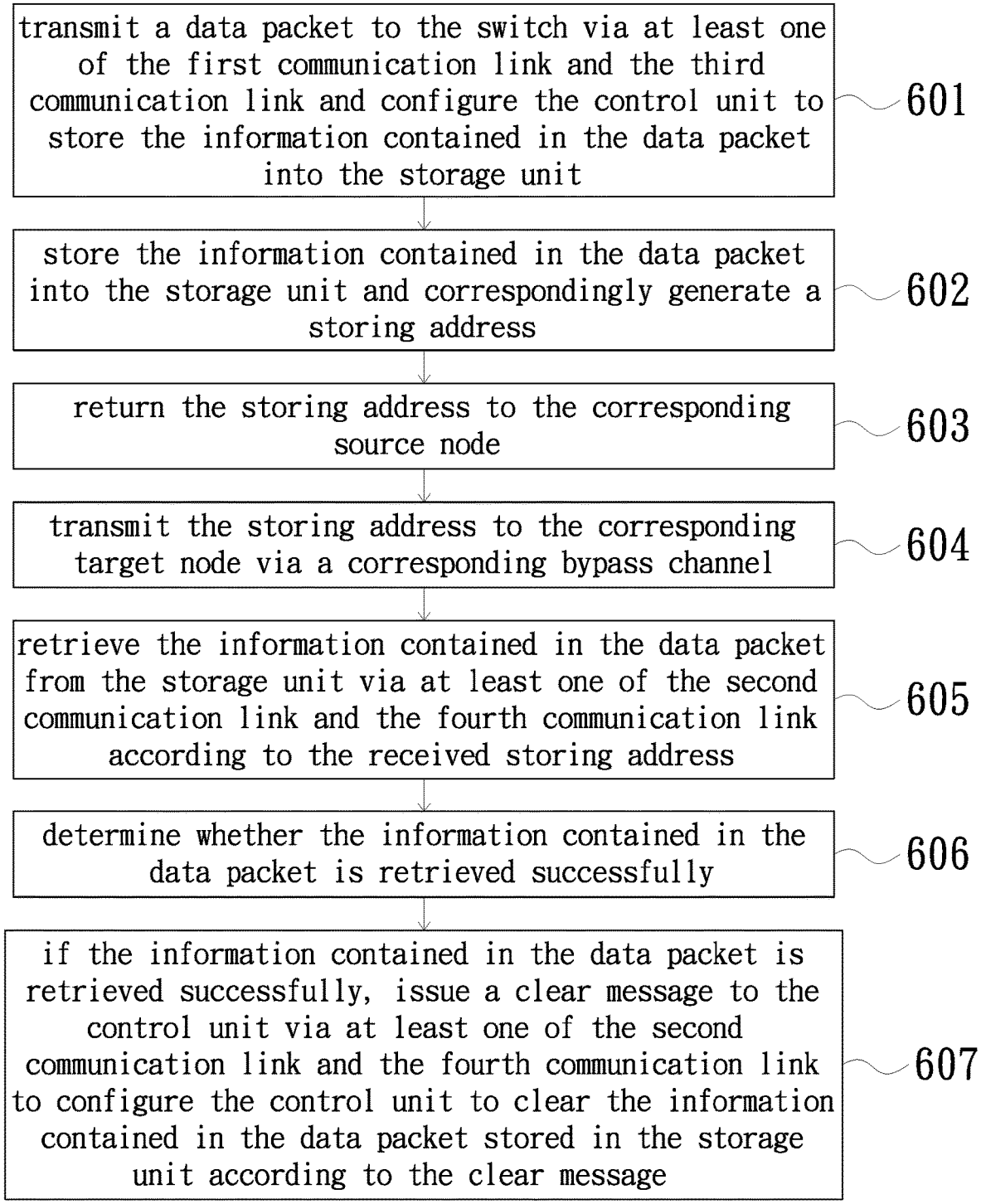
FIG. 6 is a flowchart of a data accessing method in accordance with an embodiment of the present invention.

FIG. 6 is a flowchart of a data accessing method in accordance with an embodiment of the present invention. The data accessing method of the present embodiment is adapted to be used with a switch (e.g., the switch 200 of FIG. 2). The switch 200 is configured to transmit data packets between a first source node and a first target node and between a second source node and a second target node. The switch 200 includes the storage unit 20, the control unit 21, the first port 22, the second port 23, the third port 24 and the fourth port 25. The first communication link is established between the first source node 26 and the control unit 21 via the first port 22. The second communication link is established between the first target node 27 and the control unit 21 via the second port 23. The third communication link is established between the second source node 28 and the control unit 21 via the third port 24. The fourth communication link is established between the second target node 29 and the control unit 21 via the fourth port 25.

As shown in FIG. 6, the data accessing method of the present embodiment includes steps 601-607. Step 601: transmitting a data packet to the switch 200 via at least one of the first communication link and the third communication link and configuring the control unit 21 to store the information contained in the data packet into the storage unit 20. Step 602: storing the information contained in the data packet (including the header information, error correction information and data information) into the storage unit 20 and correspondingly generating a storing address. Step 603: returning the storing address to the corresponding source node (the first source node 26 or the second source node 28). Step 604: transmitting the storing address to the corresponding target node (the first target node 27 or the second target node 29) via a corresponding bypass channel. Step 605: retrieving the information contained in the data packet from the storage unit 20 via at least one of the second communication link and the fourth communication link according to the received storing address. Step 606: determining whether the information contained in the data packet is retrieved successfully. Step 607: if the information contained in the data packet is retrieved successfully, issuing a clear message to the control unit 21 via at least one of the second communication link and the fourth communication link to configure the control unit 21 to clear the information contained in the data packet (including the header information, error correction information and data information) stored in the storage unit 20 according to the clear message.

In summary, by configuring a plurality of source nodes and target nodes to share the same storage unit, multiple source nodes could cache data packets into the storage unit via the respective communication link, and multiple target nodes could retrieve the data packets from the storage unit via the respective communication link. The switch of the present invention has improved storage resource allocation and can save more cache space, as compared with the conventional switch. Further, by configuring the control unit to manage the storage unit, the data accessing of the present invention has higher efficiency.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A data accessing method of a switch for transmitting data packets between a first source node and a first target node and between a second source node and a second target node, and the data accessing method comprising:
    transmitting a data packet to the switch via at least one of the first communication link and the third communication link and configuring the control unit to store information contained in the data packet into a storage unit;
    retrieving the information contained in the data packet from the storage unit via at least one of the second communication link and the fourth communication link,
    storing the information contained in the data packet into the storage unit and correspondingly generating a storing address;
    returning the storing address to a corresponding source node selected from at least one of the first source node and the second source node;
    transmitting the storing address to a corresponding target node selected from the first target node or the second target node via a bypass channel; and
    retrieving the information contained in the data packet from the storage unit via the at least one of the second communication link and the fourth communication link according to the received storing address;
    wherein the first source node, the second source node, the first target node and the second target node share the same storage blocks,
    wherein the switch comprises the storage unit, the control unit, a first port, a second port, a third port and a fourth port, the first communication link is established between the first source node and the control unit via the first port, the second communication link is established between the first target node and the control unit via the second port, the third communication link is established between the second source node and the control unit via the third port, and the fourth communication link is established between the second target node and the control unit via the fourth port.

2. The data accessing method according to claim 1, further comprising:
   determining whether the information contained in the data packet is retrieved successfully; and
   if the information contained in the data packet is retrieved successfully, issuing a clear message to the control unit via the at least one of the second communication link and the fourth communication link to configure the control unit to clear the information contained in the data packet stored in the storage unit according to the clear message.

3. The data accessing method according to claim 1, wherein the storage unit comprises a data block, a header block and an error correction block, the control unit comprises a data block control unit, a header block control unit and an error correction block control unit, wherein the information contained in the data packets comprises header information, error correction information and data information, the header block control unit is configured to store the header information contained in the data packets into the header block, the error correction block control unit is configured to store the error correction information contained in the data packets into the error correction block, and the data block control unit is configured to store the data information contained in the data packets into the data block.

4. The data accessing method according to claim 3, wherein the header block comprises a plurality of entries, the header block control unit comprises a header available entry marking unit, the header available entry marking unit is configured to mark available entries in the header block, and the header block control unit is configured to store the header information into the corresponding available entries according to the available entries marked by the header available entry marking unit.

5. The data accessing method according to claim 4, wherein the error correction block comprises a plurality of entries, the error correction block control unit is configured to store the error correction information into the corresponding available entries according to the available entries marked by the header available entry marking unit of the header block control unit, wherein the header information and the error correction information are synchronously stored into the corresponding available entries, respectively.

6. The data accessing method according to claim 3, wherein the data block comprises a plurality of entries, the data block control unit comprises a data entry link unit and a data available entry marking unit, the data available entry marking unit is configured to mark available entries in the data block, the data block control unit is configured to store the data information into the corresponding available entries according to the available entries marked by the data available entry marking unit, and the data entry link unit is configured to point at a next used entry of an entry in the plurality of entries in the data block.

7. The data accessing method according to claim 6, wherein the data information contained in the data packets occupies multiple entries in the data block.

8. The data accessing method according to claim 3, wherein when the corresponding source node selected from the at least one of the first source node and the second source node transmits the data packets to the switch via the at least one of the first communication link and the third communication link, the header block control unit, the error correction block control unit and the data block control unit store the header information, the error correction information and the data information into the corresponding entries so as to generate the storing address, wherein the storing address is then returned to the corresponding source node.

9. The data accessing method according to claim 8, wherein the storing address comprises a data start address and a header address.

* * * * *